United States Patent
Ishii et al.

(10) Patent No.: US 8,593,522 B2
(45) Date of Patent: Nov. 26, 2013

(54) DIGITAL CAMERA, IMAGE PROCESSING APPARATUS, AND IMAGE PROCESSING METHOD

(75) Inventors: Yasunori Ishii, Osaka (JP); Yusuke Monobe, Kyoto (JP); Yasunobu Ogura, Osaka (JP)

(73) Assignee: Panasonic Corporation, Osaka (JP)

( * ) Notice: Subject to any disclaimer, the term of this patent is extended or adjusted under 35 U.S.C. 154(b) by 405 days.

(21) Appl. No.: 13/002,771

(22) PCT Filed: Apr. 14, 2010

(86) PCT No.: PCT/JP2010/002685
§ 371 (c)(1),
(2), (4) Date: Jan. 6, 2011

(87) PCT Pub. No.: WO2010/131416
PCT Pub. Date: Nov. 18, 2010

(65) Prior Publication Data
US 2011/0122254 A1    May 26, 2011

(30) Foreign Application Priority Data
May 11, 2009    (JP) .................................. 2009-114958

(51) Int. Cl.
*H04N 5/225*    (2006.01)
*G06K 9/00*    (2006.01)

(52) U.S. Cl.
USPC .......................................... 348/169; 382/165

(58) Field of Classification Search
USPC .................................... 348/169; 382/162–172
See application file for complete search history.

(56) References Cited

U.S. PATENT DOCUMENTS 5,546,125 A * 8/1996 Tomitaka et al. ............. 348/169
5,574,498 A * 11/1996 Sakamoto et al. ............ 348/169

(Continued)

FOREIGN PATENT DOCUMENTS

JP    2-141731    5/1990
JP    7-095598    4/1995

(Continued)

OTHER PUBLICATIONS

International Search Report issued Jun. 29, 2010 in International (PCT) Application No. PCT/JP2010/002685.

(Continued)

*Primary Examiner* — Sath V Perungavoor
*Assistant Examiner* — Peter D Le
(74) *Attorney, Agent, or Firm* — Wenderoth, Lind & Ponack, L.L.P.

(57) ABSTRACT

An image processing apparatus includes a storage unit storing a first transform parameter corresponding to a first picture and information about an initial region; a transform parameter calculation unit calculating a second transform parameter according to an image-capture environment for a second picture; and a first picture transform unit transforming at least one of the first and second pictures using the first and second transform parameters. Additionally, a tracking processing unit tracks the images of the target by searching for a region having an amount of characteristics that is close to an amount of characteristics of the initial region; a second picture transform unit transforms the second picture using a third transform parameter having less variation between pictures successively captured than the second transform parameter; and an output unit outputs a search result and a picture obtained through the transformation by the second picture transform unit.

12 Claims, 5 Drawing Sheets

(56) References Cited

U.S. PATENT DOCUMENTS

| | | | |
|---|---|---|---|
| 6,100,925 A * | 8/2000 | Rosser et al. | 348/169 |
| 6,363,160 B1 * | 3/2002 | Bradski et al. | 382/103 |
| 6,529,613 B1 * | 3/2003 | Astle | 382/103 |
| 7,043,058 B2 * | 5/2006 | Cornog et al. | 382/107 |
| 7,489,804 B2 * | 2/2009 | Kontsevich | 382/103 |
| 8,340,471 B2 * | 12/2012 | Furukawa et al. | 382/299 |
| 2002/0081026 A1 | 6/2002 | Izume et al. | |
| 2003/0081813 A1 | 5/2003 | Astle | |
| 2006/0133648 A1 * | 6/2006 | Meunier et al. | 382/103 |
| 2006/0203107 A1 * | 9/2006 | Steinberg et al. | 348/239 |
| 2007/0076922 A1 * | 4/2007 | Living et al. | 382/118 |
| 2007/0160307 A1 * | 7/2007 | Steinberg et al. | 382/254 |
| 2008/0013800 A1 * | 1/2008 | Steinberg et al. | 382/118 |
| 2008/0303913 A1 * | 12/2008 | Mertens | 348/222.1 |
| 2009/0015689 A1 | 1/2009 | Murayama | |

FOREIGN PATENT DOCUMENTS

| | | |
|---|---|---|
| JP | 2568161 | 12/1996 |
| JP | 9-322153 | 12/1997 |
| JP | 2000-082135 | 3/2000 |
| JP | 2001-506820 | 5/2001 |
| JP | 2002-150287 | 5/2002 |
| JP | 2006-018389 | 1/2006 |
| JP | 2009-017457 | 1/2009 |
| WO | 98/24243 | 6/1998 |

OTHER PUBLICATIONS

S. Tominaga, et al., "Color Temperature Estimation of Scene Illumination by the Sensor Correlation Method", Institute of Electronics, Information, and Communication Engineers, May 2002, pp. 886-897 (with English translation).

* cited by examiner

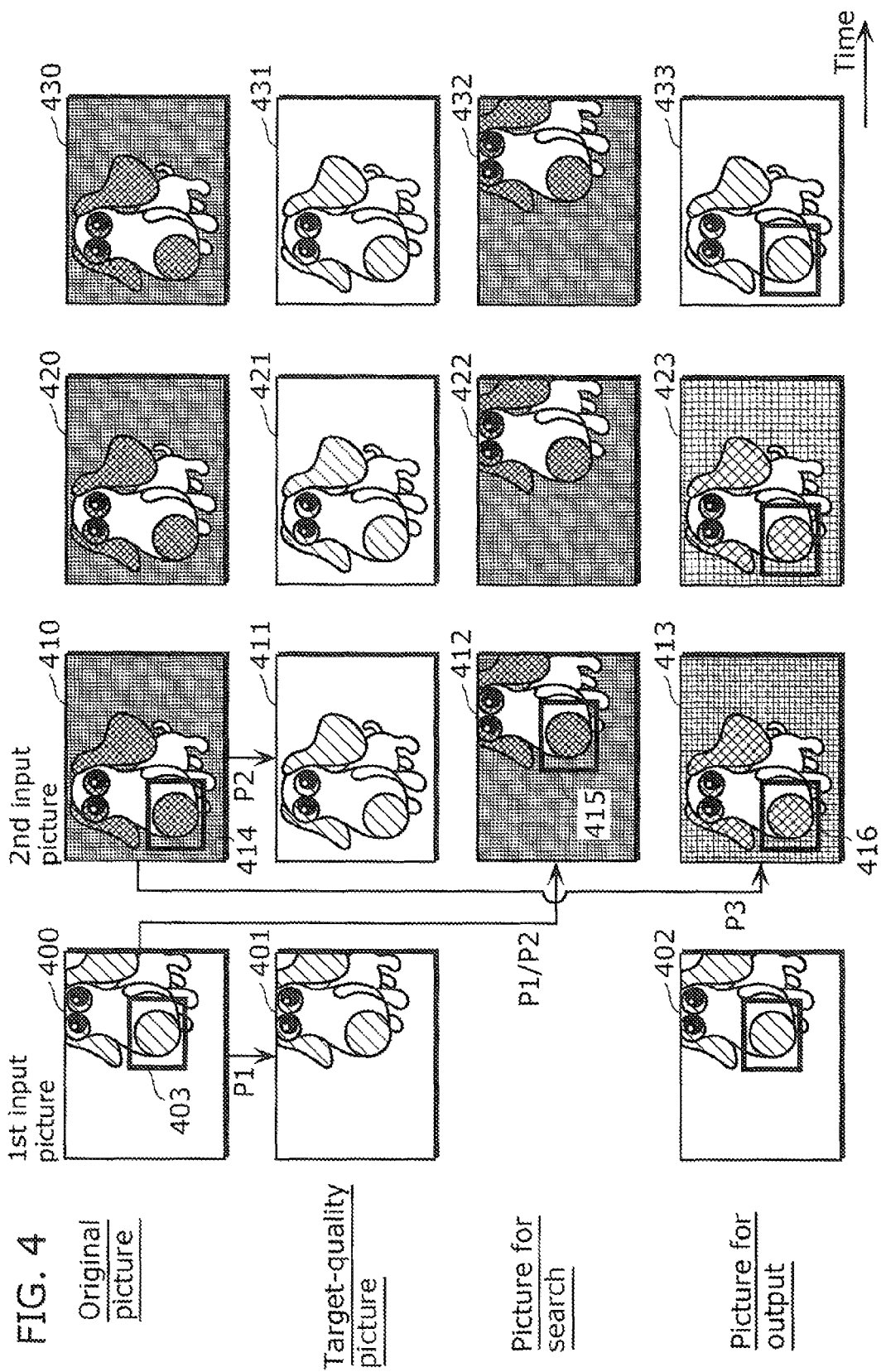

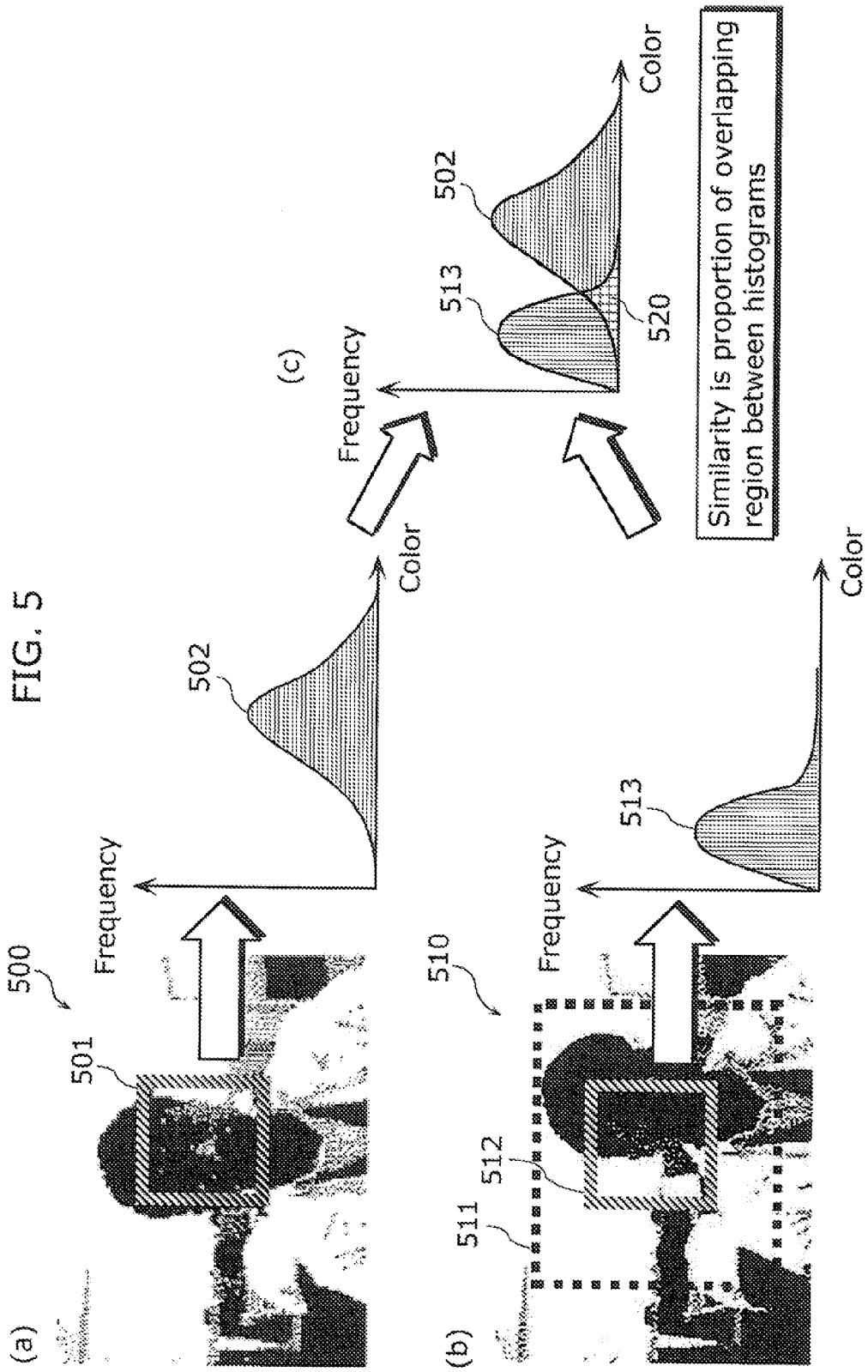

DIGITAL CAMERA, IMAGE PROCESSING APPARATUS, AND IMAGE PROCESSING METHOD

BACKGROUND OF THE INVENTION

1. Technical Field

The present invention relates to digital cameras, image processing apparatuses, and the like, and particularly to a digital camera, an image processing apparatus, and the like which track images of a target on input pictures.

2. Background Art

Recent digital cameras have an object-tracking function as positioning means for an auto-focus (AF), automatic exposure (AE), or backlight compensation function. Digital cameras are cameras for capturing still images and/or cameras for capturing moving images.

For example, a digital camera stores, as an amount of initial characteristics, color information on a specified image of a target. The digital camera then searches for a region having a similar amount of characteristics to the amount of initial characteristics on a picture captured after an image of the target is specified, to track images of the target. Specifically, the digital camera searches for a target region including an image of the target, by conducting template matching using color information or calculating the proportion of overlap between hue histograms.

A stationary camera for security purpose captures images in an almost fixed place and therefore can easily obtain information such as sunshine conditions and time changes. Thus, using the information such as sunshine conditions and time changes, the stationary camera for security purpose estimates a surrounding environment. According to the estimated environment, the stationary camera for security purpose is then able to change the color of template in template matching, for example.

However, in consumer appliances such as digital video cameras, which capture images of various targets in various environments, it is difficult to estimate a current environment. This means that in the case where there is a change in the surrounding environment (hereinafter referred to as "image-capture environment") in which an image of a target to be tracked is captured, digital cameras are unable to follow the change in the environment and therefore cause a problem such as tracking an incorrect object or interrupting the tracking process. For example, in the case where a digital camera moves from a dark place to a bright place, tones for bright parts of a picture of the target to be tracked are lost (overexposure), which causes a problem that the template matching is not possible.

To address this problem, in the case where there is a change in the image-capture environment, conventional digital cameras corrects exposure, a color temperature, or the like on a captured picture, according to a changed environment (refer to PTL 1, for example). In the method disclosed by PTL 1, a luminance pattern of a picture is determined using a difference in luminance components between inside and outside of a detection region whose position on the picture changes. An exposure control is then performed using a photometry region set at a position suitable for the determined luminance pattern.

Furthermore, a method has been proposed in which a target is tracked using not hue information but a predicted coefficient calculated using each color of red, green, and blue (RGB) and a luminance Y, with the result that the target is tracked without fail even when there is a change in color attributing to illumination (refer to PTL 2, for example).

CITATION LIST

Patent Literature

[PTL 1]
Japanese Patent Publication No. 2568161
[PTL 2]
Japanese Unexamined Patent Application Publication 7-095598

SUMMARY OF INVENTION

However, in such a conventional method as disclosed by PTL 1, a transform parameter for transforming brightness or colors of temporally continuous pictures is gradually changed to a value corresponding to an environment, in order to avoid abrupt changes. This is because, for example, in the case where brightness or a color temperature is changed, if a transform parameter for transforming brightness or a color temperature of a picture changes largely according to an environment, a user may feel strangeness or discomfort. Thus, the transform parameter is gradually changed and therefore, in the case of using, as an amount of characteristics, a color that is a particularly robust amount of characteristics, the digital camera fails to track the target.

Also in such a conventional method as disclosed by PTL 2 in which the target is tracked using the predicted coefficient, a wrong prediction makes tracking incorrect.

The present invention has been devised in the above conventional problems. An object of the present invention is to provide a digital camera, an image processing apparatus, or the like, which is capable of stably tracking an image of a target even when an amount of characteristics indicating an image of the target fluctuates due to a change in an image-capture environment.

In order to achieve the above object, a digital camera according to an aspect of the present invention is a digital camera which tracks images of a target on pictures successively captured, and executes, using a result of the tracking, at least one of an auto-focus process, an automatic exposure process, a framing process by camera control, and an automatic shooting process by camera control, the digital camera including: a storage unit configured to store a first transform parameter and information about an initial region, the initial region being a region on a first picture and including an image of the target, and the first transform parameter being a parameter that (i) corresponds to an image-capture environment in which the first picture is captured and (ii) is for transforming the first picture into a picture having predetermined image quality; a transform parameter calculation unit configured to calculate a second transform parameter according to an image-capture environment in which a second picture captured after the first picture is captured, the second transform parameter being a parameter for transforming the second picture into a picture having the predetermined image quality; a first picture transform unit configured to transform at least one of the first picture and the second picture using the first transform parameter stored in the storage unit and the second transform parameter calculated by the transform parameter calculation unit; a tracking processing unit configured to track the images of the target by searching the second picture, using a picture obtained as a result of the transformation by the first picture transform unit, for a region having an amount of characteristics that is close to an amount of characteristics that quantitatively indicates characteristics of the initial region; a second picture transform unit configured to transform the second picture using a third transform parameter that has less variation between the pictures successively captured than the second transform parameter; and an output unit configured to output a picture obtained as a result of the transformation by the second picture transform unit and information indicating the region searched for by the tracking processing unit.

With this, even in the case where the amount of characteristics indicating an image of the target fluctuates due to a change in an image-capture environment, it is possible to stably track images of the target by tracking the images of the target with use of pictures transformed using a transform parameter corresponding to the image-capture environment. Furthermore, by outputting a picture transformed using the transform parameter gradually corresponding to the change in the image-capture image, it is also possible to reduce a user's feeling of strangeness or discomfort which may be given to the user upon looking at the picture.

Furthermore, it may be possible that the first parameter, the second parameter, and the third parameter are parameters for transforming pixel values of a plurality of pixels included in the captured picture, according to at least one of a color temperature, exposure, and a luminance value that are detected from the captured picture.

This makes it possible to stably track images of the target even when there is a change in a color temperature, exposure, and a luminance value.

Furthermore, it may be possible that the first picture transform unit is configured to transform one of the first picture and the second picture using the ratio between the first transform parameter and the second transform parameter.

With this, it is only required that one of the first and second pictures is transformed, which makes it possible to reduce the load of processing of transforming a picture.

Furthermore, it may be possible that, when transforming the first picture, the first picture transform unit is configured to transform only an image included in the initial region on the first picture.

With this, it is only required that an image included in a part of the first picture is transformed, which makes it further reduce the load of processing of transforming a picture.

Furthermore, it may be possible that the amount of characteristics is a color histogram indicating a frequency distribution of colors of pixels included in the picture, and the tracking processing unit is configured to search the second picture for a region having the color histogram that is highest in a proportion of an overlap with the color histogram of the initial region.

This allows images of the target to be tracked using robust color histograms, with the result that the images of the target can be more stably tracked.

Furthermore, an image processing apparatus according to an aspect of the present invention is an image processing apparatus which tracks images of a target on pictures successively captured, the image processing apparatus including: a storage unit configured to store a first transform parameter and information about an initial region, the initial region being a region on a first picture and including an image of the target, and the first transform parameter being a parameter that (i) corresponds to an image-capture environment in which the first picture is captured and (ii) is for transforming the first picture into a picture having predetermined image quality; a transform parameter calculation unit configured to calculate a second transform parameter according to an image-capture environment in which a second picture captured after the first picture is captured, the second transform parameter being a parameter for transforming the second picture into a picture having the predetermined image quality; a first picture transform unit configured to transform at least one of the first picture and the second picture using the first transform parameter stored in the storage unit and the second transform parameter calculated by the transform parameter calculation unit; a tracking processing unit configured to track the images of the target by searching the second picture, using a picture obtained as a result of the transformation by the first picture transform unit, for a region having an amount of characteristics that is close to an amount of characteristics that quantitatively indicates characteristics of the initial region; a second picture transform unit configured to transform the second picture using a third transform parameter that has less variation between the pictures successively captured than the second transform parameter; and an output unit configured to output a picture obtained as a result of the transformation by the second picture transform unit and information indicating the region searched for by the tracking processing unit.

Furthermore, an integrated circuit according to an aspect of the present invention is an integrated circuit included in an image processing apparatus for tracking images of a target on pictures successively captured, the image processing apparatus including a storage unit storing a first transform parameter and information about an initial region, the initial region being a region on a first picture and including an image of the target, and the first transform parameter being a parameter that (i) corresponds to an image-capture environment in which the first picture is captured and (ii) is for transforming the first picture into a picture having predetermined image quality, the image integrated circuit including: a transform parameter calculation unit configured to calculate a second transform parameter according to an image-capture environment in which a second picture captured after the first picture is captured, the second transform parameter being a parameter for transforming the second picture into a picture having the predetermined image quality; a first picture transform unit configured to transform at least one of the first picture and the second picture using the first transform parameter stored in the storage unit and the second transform parameter calculated by the transform parameter calculation unit; a tracking processing unit configured to track the images of the target by searching the second picture, using a picture obtained as a result of the transformation by the first picture transform unit, for a region having an amount of characteristics that is close to an amount of characteristics that quantitatively indicates characteristics of the initial region; a second picture transform unit configured to transform the second picture using a third transform parameter that has less variation between the pictures successively captured than the second transform parameter; and an output unit configured to output a picture obtained as a result of the transformation by the second picture transform unit and information indicating the region searched for by the tracking processing unit.

It is to be noted that the present invention can be implemented not only as the image processing apparatus as above but also as an image processing method including steps of operations of characteristic components of the image processing apparatus as above. Moreover, the present invention may be implemented as a program which causes a computer to execute the steps included in such an image processing method. Such a program may be distributed via a recording medium such as a CD-ROM or a transmission medium such as the Internet.

As is clear from the above description, even with a change in the environment in which an image of the target to be tracked is captured, the digital camera, the image processing apparatus, or the like, according to an aspect of the present invention is capable of stably tracking images of the target by transforming pictures with use of a transform parameter corresponding to the change in the environment. Moreover, the digital camera, the image processing apparatus, or the like, according to an aspect of the present invention outputs a picture transformed using a parameter gradually corresponding to the change in the image-capture environment and is thereby capable of reducing a user's feeling of strangeness or discomfort which may be given to the user upon looking at the picture.

BRIEF DESCRIPTION OF DRAWINGS

FIG. 4 explains a specific example of an operation in the image processing apparatus according to the embodiment of the present invention.

FIG. 5 explains a specific example of an operation for searching in the image processing apparatus according to the embodiment of the present invention.

DETAILED DESCRIPTION OF THE INVENTION

An embodiment of the present invention is described below with reference to the drawings.

Figure 1:
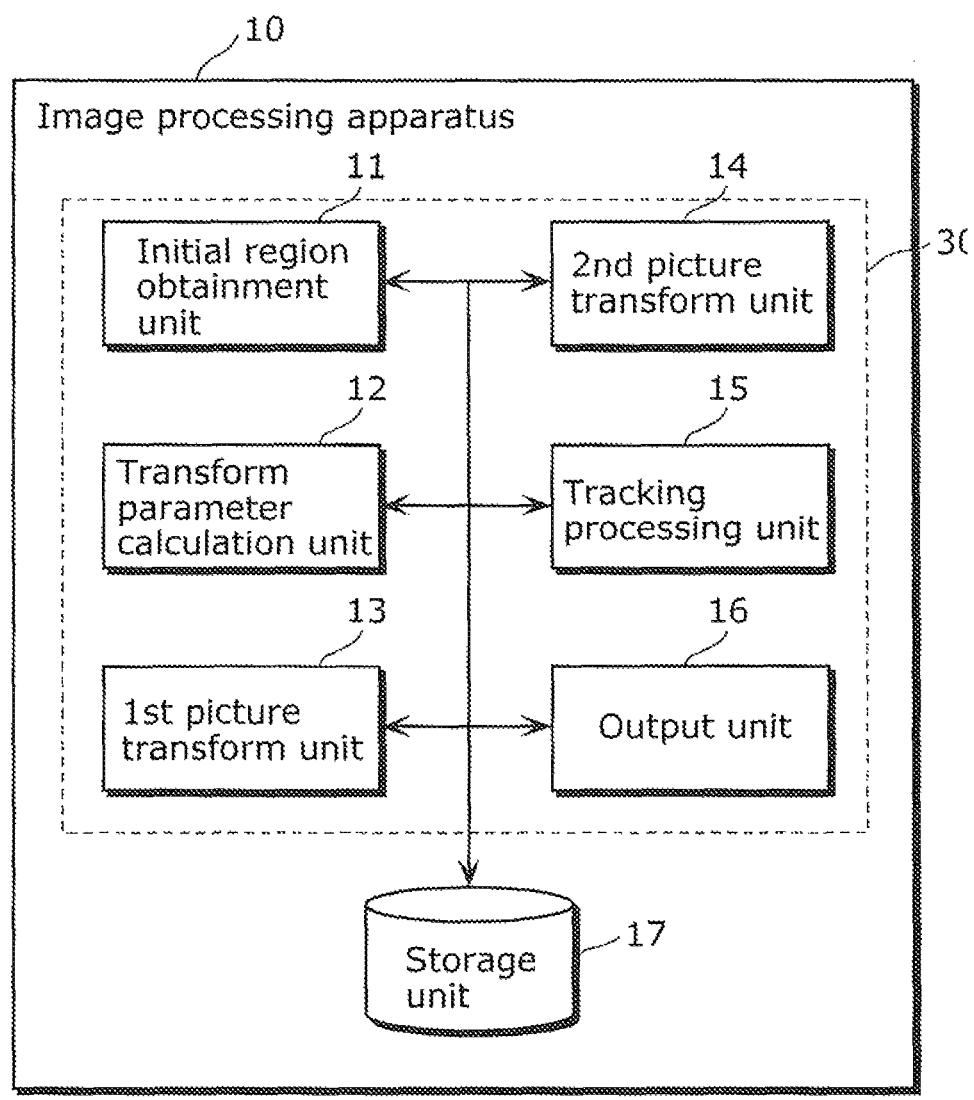
FIG. 1 is a block diagram showing a structure of functions of an image processing apparatus according to an embodiment of the present invention.

FIG. 1 is a block diagram showing a structure of functions of an image processing apparatus according to an embodiment of the present invention. As shown in FIG. 1, an image processing apparatus 10 includes an initial region obtainment unit 11, a transform parameter calculation unit 12, a first picture transform unit 13, a second picture transform unit 14, a tracking processing unit 15, an output unit 16, and a storage unit 17.

The initial region obtainment unit 11 obtains information about an initial region on a first picture which region includes an image of a target. The initial region obtainment unit 11 then stores the obtained information about the initial region in the storage unit 17. Specifically, the initial region obtainment unit 11 obtains information indicating a position and a size of the initial region, for example.

For example, in the case where a digital camera includes a touch panel as means for displaying an image being captured or an image to be captured, the initial region obtainment unit 11 obtains the information on the position of the initial region specified by a user touching the touch panel. As another example, a user orients a camera to include an object desired to be tracked, in a predetermined region such as the center of a display screen, and thereafter presses a tracking button, the initial region obtainment unit 11 may obtain the region as the initial region.

Furthermore, the initial region obtainment unit 11 obtains a first transform parameter that is a parameter for transforming a picture according to an image-capture environment in which the first picture is captured, more specifically, for transforming the first picture into a picture (hereinafter referred to simply as "target-quality picture") having predetermined image quality (hereinafter referred to as "target quality"). The initial region obtainment unit 11 then stores the obtained first transform parameter in the storage unit 17.

The target quality indicates that a picture has a color and a luminance which satisfy predetermined conditions. For example, the target quality indicates that a' picture has a predetermined color distribution or luminance distribution. Specifically, for example, the target quality indicates that, on a picture of a white subject, an image of the subject is white, no matter what color temperature a light source has. In addition, the target quality indicates that an image of a bright subject has no loss of tones (no overexposure), for example.

The transform parameter calculation unit 12 calculates a second transform parameter for transforming, into the target-quality image, a second picture captured after the first picture, according to an image-capture environment in which the second picture is captured. The predetermined image quality at this time is the same as the predetermined image quality for the first transform parameter.

Furthermore, the transform parameter calculation unit 12 calculates a third transform parameter that has less variation between pictures successively captured than the second transform parameter. That is, the transform parameter calculation unit 12 calculates the third transform parameter for transforming captured pictures into pictures which gradually follow changes in the image-capture environment in which the pictures are captured.

Specifically, the transform parameter calculation unit 12 calculates the third transform parameter such that a difference value between the third transform parameter on the second picture and the third transform parameter on the last picture captured temporally before the second picture (hereinafter referred to simply as "old third transform parameter") is equal to or below a difference value between the old third transform parameter and the second transform parameter on the second picture.

The first picture transform unit 13 transforms at least one of the first picture and the second picture using the first transform parameter stored in the storage unit 17 and the second transform parameter calculated by the transform parameter calculation unit 12. That is, the first picture transform unit 13 transforms at least one of the first picture and the second picture so that the pictures have the same or like image quality after the transformation. Specifically, for example, the first picture transform unit 13 transforms the first picture using the ratio between the first transform parameter and the second transform parameter.

The second picture transform unit 14 transforms the second picture using the third transform parameter.

The tracking processing unit 15 tracks images of the target by searching the second picture, using the pictures obtained as a result of the transformation by the first picture transform unit 13, for a region having the amount of characteristics that is closest to the amount of characteristics that quantitatively indicates characteristics of the initial region. Specifically, for example, the tracking processing unit 15 extracts an amount of characteristics of a selected region on the second picture as it changes the position and size of the region. The tracking processing unit 15 then specifies, as a target region, a region having an amount of characteristics which is, among the calculated amounts of characteristics, least different from the amount of characteristics of the initial region. The target region indicates a region including an image of the target.

The amount of characteristics indicates a color histogram indicating a frequency distribution of colors of pixels included in a region, for example. As another example, the amount of characteristics may indicate an edge detected in a region. As yet another example, the amount of characteristics may indicate luminance values of pixels included in a region.

The output unit 16 outputs a picture obtained as a result of the transformation by the second picture transform unit 14 and information indicating the region searched for by the tracking processing unit 15. Specifically, for example, the output unit 16 stores, in the storage unit 17, a picture that includes the picture obtained as a result of the transformation by the second picture transform unit 14 and a box or the like indicating the target region, in order to display the picture on a display unit of a digital camera or the like.

The storage unit 17 stores the first transform parameter and the information about the initial region.

In the above, the first, second, and third transform parameters are parameters for transforming values of a plurality of pixels included in a picture according to at least one of a color temperature, exposure, and a luminance value, which are detected from a captured picture. Specifically, for example, the first, second, and third transform parameters are transform coefficients with which luminance values of the pixels are transformed for each of R, G and B.

Figure 2:
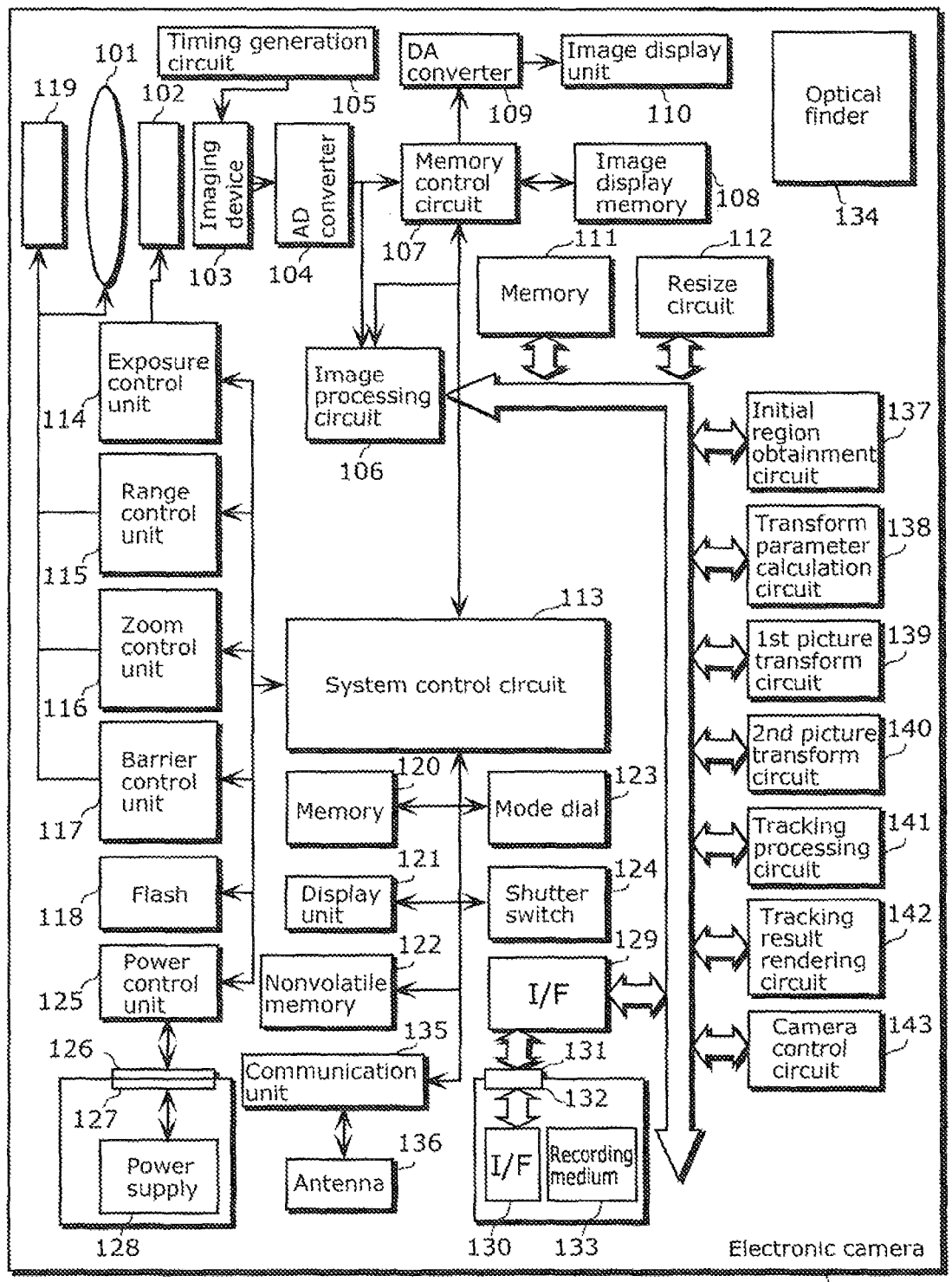
FIG. 2 is a block diagram showing a structure of a digital camera as a specific example of the image processing apparatus according to the embodiment of the present invention.

FIG. 2 is a block diagram showing a structure of a digital camera as a specific example of the image processing apparatus according to the embodiment of the present invention. As shown in FIG. 22, a digital camera 100 includes an imaging lens 101, a shutter 102, an imaging device 103, an AD converter 104, a timing generation circuit 105, an image processing circuit 106, a memory control circuit 107, an image display memory 108, a DA converter 109, an image display unit 110, a memory 111, a resize circuit 112, a system control circuit 113, an exposure control unit 114, a range control unit 115, a zoom control unit 116, a barrier control unit 117, a flash 118, a protector 119, a memory 120, a display unit 121, a nonvolatile memory 122, a mode dial switch 123, a shutter switch 124, a power control unit 125, connectors 126 and 127, a power supply 128, interfaces 129 and 130, connectors 131 and 132, a recording medium 133, an optical finder 134, a communication unit 135, an antenna 136, an initial region obtainment circuit 137, a transform parameter calculation circuit 138, a first picture transform circuit 139, a second picture transform circuit 140, a tracking processing circuit 141, a tracking result rendering circuit 142, and a camera control circuit 143. The power supply 128 and the recording medium 133 may be detachable.

The imaging lens 101 is a lens capable of zooming and focusing, thereby collecting incident light on the imaging device 103 so as to form an image thereon.

The shutter 102 is capable of stopping down, thus regulating an amount of light incident on the imaging device 103.

The imaging device 103 transforms an optical image formed by the incident light, into electrical signals (image data).

The AD converter 104 converts analog signals provided from the imaging device 103, to digital signals. The AD converter 104 writes the image data converted to the digital signals, in the image display memory 108 or the memory 111 via the memory control circuit 107. Alternatively, the AD converter 104 outputs the image data converted to the digital signals, to the image processing circuit 106.

The timing generation circuit 105 provides a clock signal or a control signal to the imaging device 103, the AD converter 104, and the DA converter 109. The timing generation circuit 105 is controlled by the memory control circuit 107 and the system control circuit 113.

The image processing circuit 106 performs a predetermined image interpolation process, color conversion process, or the like on the image data provided from the AD converter 104 or the image data provided from the memory control circuit 107. The image processing circuit 106 performs a predetermined arithmetic operation using the input image data, and the system control circuit 113 controls the exposure control unit 114 and the range control unit 115 based on the obtained operation result.

The memory control circuit 107 controls the AD converter 104, the timing generation circuit 105, the image processing circuit 106, the image display memory 108, the DA converter 109, the memory 111, and the resize circuit 112.

The image display memory 108 stores image data for display.

The DA converter 109 receives the image data for display from the image display memory 109 via the memory control circuit 107, and converts the digital signals to the analog signals.

The image display unit 110 displays the image data for display converted by the DA converter 109 to the analog signals. Moreover, the image display unit 110 may receive, from a user, information for specifying a region in which an image of the target to be tracked is included (initial region). The image display unit 110 is a display such as a thin film transistor liquid crystal display (TFTLCD) or a touch panel.

The memory 111 stores the image data formed by the AD converter 104 and the image data processed by the image processing circuit 106. Furthermore, the memory 111 stores information necessary for the tracking processing, such as the information about the initial region obtained by the initial region obtainment circuit 137. The memory 111 corresponds to the storage unit 17 of FIG. 1.

The resize circuit 112 generates a low resolution picture from the captured picture. It is to be noted that the resize circuit 112 is capable of selecting predetermined resolutions according to application. The resize circuit 112 retrieves the image data stored in the memory 111, performs a resizing process on the retrieved image data, and writes the processed data in the memory 111.

The resize circuit 112 is put to use, for example, when it is desired to record the image data in the recording medium 133 or the like with the different number of pixels (size) from the number of pixels in the imaging device 103. The number of pixels displayable on the image display unit 110 is considerably smaller than the number of pixels in the imaging device 103. The resize circuit 112 is therefore used also for generating the image for display when the data of captured image is to be displayed on the image display unit 110.

The system control circuit 113 controls various processing units and various processing circuits in the whole digital camera 100, thereby performing an image capture process. The image capture process includes an exposure process, a development process, and a recording process. The exposure process is processing in which the image data retrieved from the imaging device 103 is written in the memory 111 via the AD converter 104 and the memory control circuit 107. The development process is arithmetic operations in the image processing circuit 106 and the memory control circuit 107. The recording process is processing in which the image data is retrieved from the memory 111 and written in the recording medium 133.

The exposure control unit 114 controls the shutter 102 capable of stopping down. In addition, as working with the flash 118, the exposure control unit 114 has a function of adjusting a flash of light.

The range control unit 115 controls focusing of the imaging lens 101. The zoom control unit 116 controls zooming of the imaging lens 101. The barrier control unit 117 controls the operation of the protector 119.

The flash 118 illuminates a subject with a flash of light. Furthermore, the flash 118 has a function of providing AF auxiliary light and a function of adjusting a flash of light.

The protector 119 is a barrier which covers an imaging unit of the digital camera 100 which unit includes the imaging lens 101, the shutter 102, and the imaging device 103, to protect the imaging unit from dirt and breakage.

The memory 120 records a constant, a variable, a program, and so on for operation of the system control circuit 113.

The display unit 121 is a liquid crystal display device which displays an operation state, a message, or the like using characters, images, or audio according to execution of a program in the system control circuit 113, or alternatively is a speaker or the like. The display unit 121 or the display units 121 are provided at an easily viewable position or positions near an operation unit of the digital camera 100. The display unit 121 is formed by combination of an LCD, light emitting diodes (LED), a sound device, and so on, for example.

The nonvolatile memory 122 is a memory capable of electric erasing and recording, and stores operation setting data of the digital camera 100, user-specific information, or the like. The nonvolatile memory 122 is an electrically erasable and programmable read only memory (EEPROM), for example.

The mode dial switch 123 is capable of setting a function mode by switching between various modes such as an automatic shooting mode, a shooting mode, a panorama shooting mode, and an RAW mode.

The shutter switch 124 turns on in the course of operation of a shutter button (not shown) and thereby instructs the start of operations such as the AF processing, the AE processing, and the auto white balance (AWB) processing. Furthermore, the shutter switch 124 instructs the start of operations in a series of processing including the exposure process, the development process, and the recording process.

The power control unit 125 includes a battery detection circuit, a DC-DC converter, and a switch circuit for switching a block between conducting and non-conducting states. The power control unit 125 detects whether or not a battery is mounted, of what type the battery is, and how much the battery is left. Furthermore, on the basis of the detection result and the instruction given by the system control circuit 113, the power control unit 125 controls the DC-DC converter so that necessary voltage is fed back to provide voltage to the various processing units including the recording medium 113 via the connectors 126 and 127.

The connectors 126 and 127 are connectors for establishing connection between the power control unit 125 and the power supply 128.

The power supply 128 is a primary battery such as an alkaline battery or a lithium battery, a secondary battery such as a NiCd battery, a NiMH battery or a Li battery, or an AC adapter.

The interfaces 129 and 130 are interfaces for transmission of the image data and so on between the recording medium 133 and the memory 111 or the like.

The connectors 131 and 132 are connectors for establishing connection to the recording medium 133 via the interface 129 and the interface 130.

The recording medium 133 is a recording medium such as a memory card or hard disk for recording the image data.

The optical finder 134 is a finder through which a photographer checks the subject. It is possible that a photographer takes an image by using only the optical finder 134 without using the electronic finder function of the image display unit 110.

The communication unit 135 has various communication functions such as RS232C, USB, IEEE1394, modem, LAN, or radio communication.

The antenna 136 is a connector which connects the digital camera 100 with another device using the communication unit 135, or is an antenna in the radio communication.

The initial region obtainment circuit 137 obtains the information about the initial region specified with reference to the position on the touch panel at which a user inputs, the AF region set by a user pressing the shutter switch 124, or the like, and writes the obtained information in the memory 111. The initial region obtainment circuit 137 corresponds to the initial region obtainment unit 11 of FIG. 1.

The transform parameter calculation circuit 138 calculates a transform parameter for transforming an input picture into a picture having a color or brightness equivalent to a color or brightness visually recognized by a user. Specifically, for example, the transform parameter calculation circuit 138 detects a color temperature of light with which the target is illuminated, and calculates a transform parameter for transforming a color of an input picture, according to the detected color temperature. The transform parameter calculation circuit 138 corresponds to the transform parameter calculation 12 of FIG. 1.

The first picture transform circuit 139 retrieves, from the memory 111, a picture including the initial region. Furthermore, the first picture transform circuit 139 transforms the retrieved picture using the transform parameter calculated by the transform parameter calculation circuit 138. The first picture transform circuit 139 corresponds to the first picture transform unit 13 of FIG. 1.

The second picture transform circuit 140 retrieves an input picture from the memory 111. Furthermore, the second picture transform circuit 140 transforms the retrieved picture using the transform parameter calculated by the transform parameter calculation circuit 138. The second picture transform circuit 140 corresponds to the second picture transform unit 14 of FIG. 1.

The tracking processing circuit 141 retrieves, from the memory 111, the picture transformed by the first picture transform circuit 139, and calculates an amount of characteristics of the retrieved picture. The tracking processing circuit 141 then searches the input picture for a region having the amount of characteristics that is closest to the calculated amount of characteristics, to perform a tracking process for an image of the target. Furthermore, the tracking processing circuit 141 writes a tracking result (such as coordinate data and evaluation values) in the memory 111. The tracking processing circuit 141 corresponds to the tracking processing unit 15 of FIG. 1.

The tracking result rendering circuit 142 processes the image data for display written in the image display memory 108, in order to display on the display unit 121 the tracking result written in the memory 111. Specifically, the tracking result rendering circuit 142 performs, on the image data, processing such as tracking box or mosaic rendering, changing of characters and colors for display, and feathering. The tracking result rendering circuit 142 corresponds to the output unit 16 of FIG. 1.

The camera control circuit 143 controls the AF processing, based on the position and size of the tracking result (target region) written in the memory 111, so that the target included in the target region is in focus. Specifically, for example, the camera control circuit 143 controls the imaging lens 101 so as to increase the contrast by using the contrast of the target included in the target region.

Furthermore, the camera control circuit 143 may control the AE processing or the backlight compensation process so that the exposure of the target included in the target region is appropriate. Specifically, for example, the camera control circuit 143 may control, via the exposure control unit 114, a shutter speed and an aperture of the shutter 102 capable of stopping down, according to the mode including a shutter-speed priority mode or an aperture priority mode.

In addition, the camera control circuit 143 may control the digital camera 100 so that the target is at a predetermined position or has a predetermined size in the picture (for example, so that the target, e.g., a face, is located in the center of the picture, or that the whole of the target, e.g., an entire body of a person, is included).

It is to be noted that, in the case where any one of the initial region obtainment circuit 137, the transform parameter calculation circuit 138, the first picture transform circuit 139, the second picture transform circuit 140, the tracking processing circuit 141, the tracking result rendering circuit 142, and the camera control circuit 143 is absent, the system control circuit 113 may perform the tracking process and so on in software processing.

Next, various operations in the image processing apparatus configured as above are described.

Figure 3:
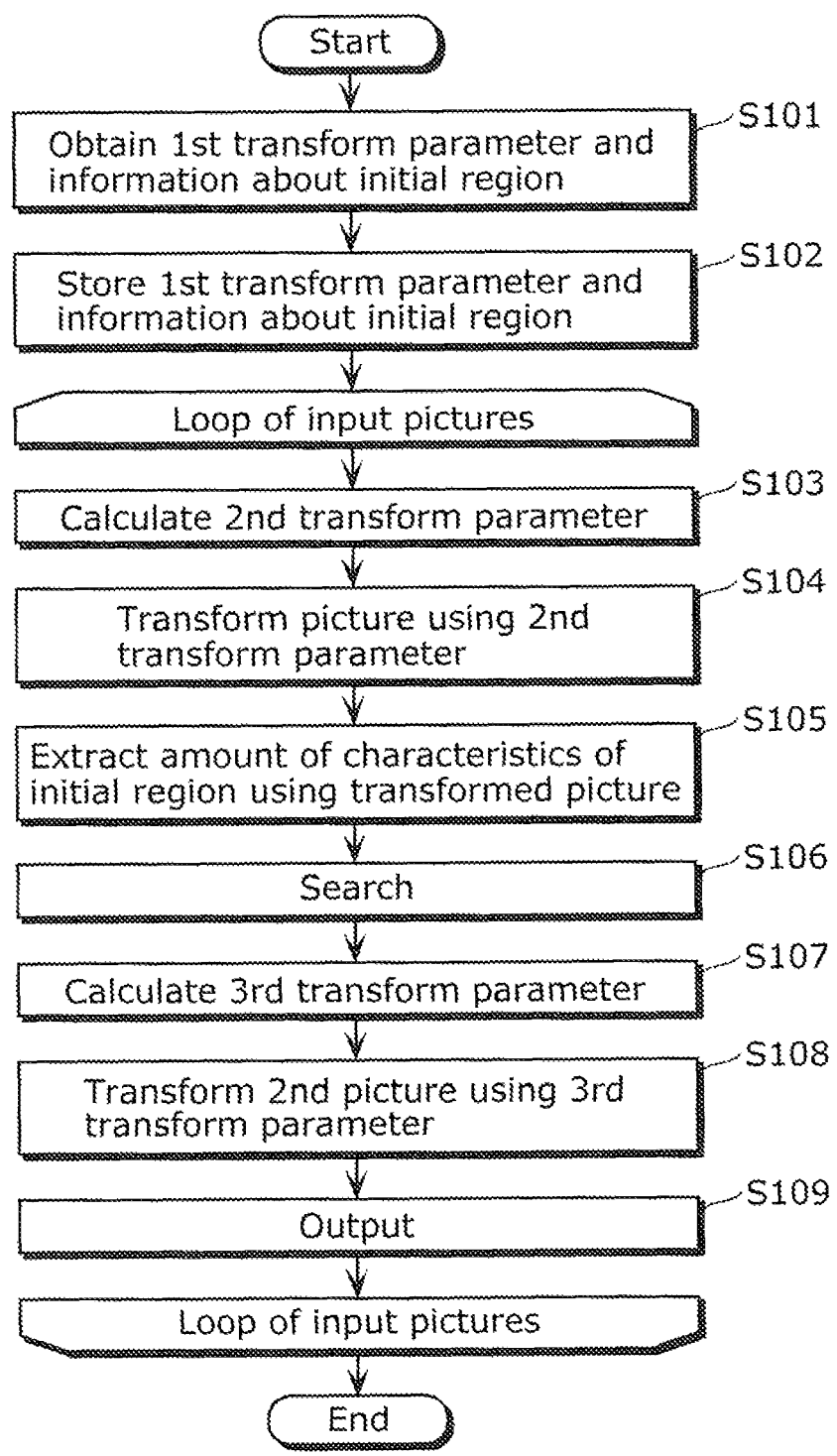
FIG. 3 is a flowchart showing an operation of the image processing apparatus according to the embodiment of the present invention.

FIG. 3 is a flowchart showing an operation of the image processing apparatus according to the embodiment of the present invention.

First, the initial region obtainment unit 11 obtains the first transform parameter and the information about the initial region (Step S101). Specifically, for example, the initial region obtainment unit 11 obtains, as the information about the initial region, coordinates of the position of the initial region and a value indicating the size of the initial region. Moreover, the initial region obtainment unit 11 obtains, as the first transform parameter, a color temperature parameter for transforming the first picture into a picture on which an image of the target has a correct color regardless of a color temperature of a light source, for example. Subsequently, the initial region obtainment unit 11 stores, in the storage unit 17, the obtained first transform parameter and the obtained information about the initial region (Step S102).

After that, the image processing unit 10 repeats the processing of specifying the target region on pictures captured after the first picture. The processing of specifying the target region is as follows.

First, the transform parameter calculation unit 12 calculates the second transform parameter for transforming a picture to be processed (hereinafter referred to as "second picture") into a target-quality picture (Step S103). Specifically, for example, the transform parameter calculation unit 12 calculates, as the second transform parameter, a color temperature parameter for transforming the second picture into a picture on which an image of the target has a correct color regardless of a color temperature of a light source.

Next, the first picture transform unit 13 transforms the first picture using the first transform parameter stored in the storage unit 17 and the second transform parameter calculated by the transform parameter calculation unit 12 (Step S104). Specifically, for example, the first picture transform unit 13 retrieves the first picture and the first transform parameter from the storage unit 17. The first picture transform unit 13 then multiplies a value of each pixel included in the retrieved first picture, by a value obtained by dividing the first transform parameter by the second transform parameter calculated by the transform parameter calculation unit 12, for example.

Subsequently, the tracking processing unit 15 extracts the amount of characteristics of the initial region from the picture transformed in Step S104 (Step S105). Specifically, for example, the tracking processing unit 15 retrieves the coordinates of the position of the initial region and a value indicating the size of the initial region which coordinates and value are stored in the storage unit 17. The tracking processing unit 15 then specifies a plurality of pixels included in the initial region using the retrieved coordinates and value indicating the size, for example. The tracking processing unit 15 then extracts, as an amount of characteristics, a color histogram representing a frequency distribution of colors of the specified pixels.

Next, the tracking processing unit 15 searches the second picture for a region having the amount of characteristics that is closest to the extracted amount of characteristics, thereby specifying the target region including an image of the target (Step S106). That is, the tracking processing unit 15 specifies the target region to track the target. Specifically, for example, the tracking processing unit 15 selects a region on the second picture as it changes the position and size of the region, and compares the amount of characteristics of the selected region with the amount of characteristics of the initial region. According to the comparison, the tracking processing unit 15 then specifies, as the target region, a region having the least different amount of characteristics among the selected regions.

Furthermore, the transform parameter calculation unit 12 calculates the third transform parameter that has less variation between pictures successively captured than the second transform parameter (Step S107). Specifically, the transform parameter calculation unit 12 calculates the third transform parameter such that a difference value between the old third transform parameter and the third transform parameter is equal to or below a difference value between the old third transform parameter and the second transform parameter.

Next, the second picture transform unit 14 transforms the second picture using the third transform parameter calculated by the transform parameter calculation unit 12 (Step S108). The processing in Step 107 and Step 108 may be executed before the processing from Step 104 to Step S106. Alternatively, the processing in Step 107 and Step 108 may be executed in parallel with the processing from Step 104 to Step S106.

Lastly, the output unit 16 outputs the information indicating the target region searched for in Step S106 and the picture obtained as a result of the transformation in Step S108 (Step S109). Specifically, for example, the output unit 16 stores, in the storage unit 17, a picture in which a box indicating the position of the target region has been added to the picture obtained as a result of the transformation in Step S108.

The image processing apparatus 10 is capable of tracking images of the target by repeating, for each of the input images continuously captured, the above processing from Step S103 to Step S109.

The following describes specific examples of various operations in the image processing apparatus 10 which uses, as the transform parameters, transform coefficients for each of R, G and B, for transforming colors of respective pixels.

FIG. 4 explains a specific example of an operation in the image processing apparatus according to the embodiment of the present invention. Specifically, FIG. 4 explains the processing executed in a case where a subject, i.e., a dog, moves from outside to inside, with the result that light with which the dog is illuminated changes from light of the sun to light of a fluorescent.

In FIG. 4, the first row shows original pictures that are pictures captured by an imaging device or the like. The second row shows target-quality pictures having target image quality, generated by transforming the original pictures. The target-quality pictures do not need to be actually generated, but they are shown to explain the transform parameters. The third row shows pictures for search that are pictures generated by transforming an original picture 400 so that they are used to search for the target region. The fourth row shows pictures for output that are pictures generated by transforming the original picture so that they are displayed on the display unit.

The original picture 400 is a picture corresponding to the first picture and captured at the start of shooting. Moreover, the original picture 400 is a picture of the dog illuminated with light of the sun. In the original picture 400, an initial region 403 is specified by a user as a region including an image of the target to be tracked. This initial region 403 is specified, for example, by a user touching an image of the target on a touch panel displaying the picture.

A target-quality picture 401 is a picture generated by transforming the first picture using a first transform parameter P1. For the sake of convenience in the description, the target-quality picture 401 and the original picture 400 are the same picture in FIG. 4.

The first transform parameter P1 is a transform parameter calculated by the transform parameter calculation unit 12 and is a transform coefficient for each of R, G, and B for correctly showing a color of a subject regardless of a color temperature of a light source. Specifically, for example, the transform parameter calculation unit 12 calculates a color temperature parameter from the original picture 400 using a correlation with an existing color gamut, for example (refer to Non-Patent Literature 1 "Color Temperature Estimation of Scene Illumination by the Sensor Correlation Method (Transactions of the Institute of Electronics, Information and Communication Engineers. D-II, by Tominaga et al.)"). A pixel value V2 of each pixel included in the target-quality picture 401 is represented by (Ex. 1) using a pixel value V1 of each pixel included in the original picture 400 and the first transform parameter P1.

[Math 1]

$$V2(R,G,B) = P1(R,G,B) * V1(R,G,B) \quad \text{(Ex. 1)}$$

A picture for output 402 is a picture to be displayed on the display unit, which picture is generated by the second picture transform unit 14 from the original picture 400 by transforming it. Because the original picture 400 is a picture captured at the start of shooting, the third transform parameter is the same as the first transform parameter. The second picture transform unit 14 therefore transforms the original picture 400 into the picture for output 402 using the first transform parameter P1.

An original picture 410 is a picture corresponding to the second picture and captured next to the original picture 400. Moreover, the original picture 410 is a picture of the same dog in the same background as the original picture 400. However, the light source in the original picture 410 is a fluorescent, which is different from the light source in the original picture 400. In other words, the original picture 410 is captured in an environment different from the image-capture environment in which the original picture 400 is captured. The original picture 410 is therefore a picture having different image quality from the original picture 400 and even when the original picture 410 includes an image of the target included in the original picture 400, they have different colors.

A target-quality picture 411 is a picture generated by transforming the first picture using a second transform parameter P2. As in the case of the first transform parameter P1, the second transform parameter P2 is a transform parameter calculated by the transform parameter calculation unit 12 and is a transform coefficient for each of R, G, and B for correctly showing a color of a subject regardless of a color temperature of a light source.

A picture for search 412 is generated by the first picture transform unit 13 from the original picture 400 by transforming it using the ratio between the first transform parameter P1 and the second transform parameter P2. That is, the picture for search 412 is a picture generated from the original image 400 so as to have the same or like image quality as the original picture 410. Specifically, using (Ex. 2), the first picture transform unit 13 transforms the original picture 400 having the pixel value V1 as a pixel value of each pixel for each of R, G, and B, into the picture for search 412 having a pixel value V3 as the pixel value of each pixel for each of R, G, and B.

[Math 2]

$$V3(R,G,B) = \frac{P1(R,G,B)}{P2(R,G,B)} * V1(R,G,B) \quad \text{(Ex. 2)}$$

On the picture for search 412 generated by such transformation, the tracking processing unit 15 extracts an amount of characteristics of a region 415 co-located with a corresponding size to the initial region 403 on the original picture 400. The tracking processing unit 15 then searches the original picture 410 for a region having the amount of characteristics that is closest to the extracted amount of characteristics. As a result of the search, the tracking processing unit 15 specifies a target region 414 as shown on the original picture 410.

The picture for output 413 is generated by the second picture transform unit 14 from the original picture 410 by transforming it using the third transform parameter P3, and includes a box 416 that is information indicating the searched-for target region 414 on the original picture 410. This third transform parameter P3 is a transform parameter having smaller variation from an old third transform parameter P3*pr* (which is the first transform parameter P1 in this case) than the second transform parameter P2. Specifically, for example, the third transform parameter P3 is a parameter satisfying (Ex. 3). (Ex. 3) indicates that the sum of absolute values of differences for the respective R, G, and B between the old third transform parameters and the third transform parameters is equal to or smaller than the sum of absolute values of differences for the respective R, G, and B between the second transform parameters and the old third transform parameters.

[Math 3]

$$\sum_{RGB} |P3(R,G,B) - P3pr(R,G,B)| \leq \quad \text{(Ex. 3)}$$

$$\sum_{RGB} |P2(R,G,B) - P3pr(R,G,B)|$$

More specifically, in the case where the variation between the second transform parameter P2 and the old third transform parameter P3*pr* is equal to or smaller than a predetermined threshold, the transform parameter calculation unit 12 calculates the second transform parameter P2 as the third transform parameter P3. On the other hand, in the case where the variation between the second transform parameter P2 and the old third transform parameter P3*pr* is larger than the predetermined threshold, the transform parameter calculation unit 12 calculates, as the third transform parameter P3, a value which makes the variation between the second transform parameter P2 and the old third transform parameter P3$pr$ equal to the threshold.

Original pictures 420 and 430 are pictures captured temporally after the original picture 410 in the image-capture environment in which the original picture 410 is captured. Target-quality pictures 421 and 431, pictures for search 422 and 432, and pictures for output 423 and 433 correspond to the original pictures 420 and 430, respectively.

That is, the second picture transform unit 14 transforms the original pictures 410, 420, and 430 into the pictures for output 413, 423, and 433, using the third transform parameter having smaller temporal variation. As shown in FIG. 4, the output unit 16 can therefore output pictures (the pictures for output 413, 423, and 433) which gradually change to the target-quality picture just as images recognized by a human gradually adapted to a changing environment.

Next, a specific example of the searching process using a color histogram as an amount of characteristics is described.

FIG. 5 explains a specific example of an operation for searching in the image processing apparatus according to the embodiment of the present invention. FIG. 5(a) shows a first picture 500 and an initial region 501. An initial color histogram 502 is a color histogram of the initial region 501 on a picture obtained as a result of the transformation by the first picture transform unit 13.

The color histogram is information indicating the distribution of frequencies of colors in pixels included in an image or a part of an image. For example, the horizontal axis of the color histogram represents 20 color sections of hue (H) values (0 to 360) in the color space of hue, saturation, and value (HSV). The horizontal axis of the color histogram represents the number (frequency) of pixels included in each of the sections. A color section to which each of the pixels belongs may be determined by the integer portion of a value obtained by dividing the hue (H) value of each pixel by the number of sections.

The number of sections is not necessarily 20 and may be any number as long as it is no less than 1. However, it is preferable that the number of sections be larger as the number of colors included in the initial region is larger. This allows for improved accuracy in specifying the target region because a similar region can be searched for using the frequency for each of small sections when the initial region includes a large number of colors. On the other hand, when the initial region includes a small number of colors, the count for each of large sections is stored, which allows for a smaller memory usage.

Next, as shown in FIG. 5(b), the tracking processing unit 15 determines a search region 511 in a next second picture 510 temporally successive to the first picture 500. Specifically, the tracking processing unit 15 determines, as the search region 511, a rectangular region which includes the target region (in this case, the initial region 501) in the first picture 500 and is larger than the target region (in this case, the initial region 501). More specifically, the tracking processing unit 15 retrieves the length of a side and the coordinates of the center position of the initial region 501 stored in the storage unit 17. The tracking processing unit 15 then determines, as the search region, a rectangular region which has a side larger than the retrieved length of a side and is centered on the coordinates of the retrieved center position.

The shape of the search region is not necessarily rectangular and may be any given shape including a circle and a hexagon. The size of the search region may be determined in advance, or may be larger as the frame rate or the shutter speed is lower.

Subsequently, the tracking processing unit 15 selects, as a selected region 512, a region which is smaller than the search region 511 and included in the search region 511. The tracking processing unit 15 then extracts a selected color histogram 513 that is the color histogram of the selected region 512. At this time, the selected color histogram 513 is preferably normalized using the initial color histogram 502. Specifically, the tracking processing unit 15 preferably normalizes the selected color histogram 513 by dividing the frequency of each section in the color histogram of the selected region by the frequency of a corresponding section of the initial color histogram 502.

Subsequently, as shown in FIG. 5(c), the tracking processing unit 15 calculates, as similarity, the proportion of an overlapping part 520 that is an overlap between the initial color histogram 502 and the selected color histogram 513. Specifically, the tracking processing unit 15 calculates the similarity according to (Ex. 4).

[Math 4]

$$S_{R1} = \sum_{i=0}^{dim} \text{Min}(R_i, I_i)$$ (Ex. 4)

In the above expression, $R_i$ represents the frequency of the "i"-th section in the initial color histogram 502, and $I_i$ represents the frequency of the "i"-th section in the selected color histogram 513. In this case, "i" is a value from 0 to 19 because there are 20 sections. It is to be noted that a higher proportion of the overlapping part 520 indicates higher similarity, and a lower proportion of the overlapping part 520 indicates lower similarity.

The tracking processing unit 15 thus repeats selection of the region 512 and extraction of the selected color histogram 513 while the region 512 is different in position and size in the search region 511, and thereby specifies, as the target region, the selected region 512 which is highest in the proportion of the overlapping part 520 between the color histograms. The tracking processing unit 15 then stores, in the storage unit 17, the length of a side and the coordinates of the center position of the target region.

As above, even when the amount of characteristics indicating an image of the target fluctuates due to a change in the image-capture environment in which the image of the target is captured, the image processing apparatus 10 according to the present embodiment searches for the target region using the picture for search which picture is generated by transforming the first picture using the first and second transform parameters corresponding to the image-capture environment. That is, the image processing apparatus 10 uses, in stead of a parameter which gradually follows a change in the image-capture environment, a parameter which promptly follows a change in the image-capture environment, to search for the target region with use of the picture for search which picture is generated by transforming the first picture so that the first picture has the same or like image quality as the second picture. As a result, the image processing apparatus 10 is capable of stably tracking images of the target regardless of a change in the image-capture environment.

Furthermore, the image processing apparatus 10 outputs a picture transformed using the third parameter gradually corresponding to the change in the image-capture environment and is thereby capable of reducing a user's feeling of strangeness or discomfort which may be given to the user upon looking at the picture.

Moreover, the image processing unit 10 transforms only the first picture out of the first and second pictures and is thus capable of reducing the load of processing of transforming a picture as compared to the load of transforming both of the first and second pictures.

In addition, the image processing apparatus 10 can track images of the target using robust color histograms and is thus capable of more stably tracking images of the target.

While the image processing apparatus of the digital camera according to an implementation of the present invention has been described with reference to embodiments thereof, the present invention is not limited to these embodiments. The scope of the present invention includes various variation of the embodiments which will occur to those skilled in the art, without departing from the basic principles of the present invention.

For example, while the first picture transform unit 13 transforms the first picture in the above embodiment, the first picture transform unit 13 may transform the second picture so that the second picture has the same or like image quality as the first picture. The first picture transform unit 13 may both of the first picture and the second picture into the target-quality pictures so that the pictures have the same or like image quality after the transformation. Specifically, for example, in the case of transforming only one of the first picture and the second picture, the first picture transform unit 13 transforms, using (Ex. 5), the original picture 410 (the second picture) having a pixel value V4 as a pixel value of each pixel for each of R, G, and B, into a picture for search having a pixel value V5 as a pixel value of each pixel for each of R, G, and B. On the picture for search generated by such transformation, the tracking processing unit 15 then searches for a region having the amount of characteristics that is closest to an amount of characteristics which is extracted from the initial region 403 on the original picture 400.

[Math 5]

$$V5(R, G, B) = \frac{P2(R, G, B)}{P1(R, G, B)} * V4(R, G, B) \quad \text{(Ex. 5)}$$

Furthermore, while the first picture transform unit 13 transforms the entirety of the first picture, the first picture transform unit 13 may transform only an image included in the initial region on the first picture. This allows the image processing unit 10 to reduce the load of processing in the first picture transform unit 13. In this case, the storage unit 17 needs to store, as the information about the initial region, only the pixel value for each pixel in the initial region. This allows the image processing apparatus 10 to reduce a memory usage of the storage unit 17 as compared to the case of storing the entirety of the first picture.

Furthermore, the storage unit 17 may store, as the information about the initial region, an amount of characteristics extracted from the initial region. In this case, the first picture transform unit 13 transforms the amount of characteristics of the initial region, instead of transforming the first picture. This eliminates the need for extraction of an amount of characteristics from the initial region by the tracking processing unit 15 every time the target region is searched for on a captured picture, with the result that the load on the tracking processing unit 15 can be reduced.

Furthermore, while the tracking processing unit 15 extracts the color histogram in the above embodiment, the tracking processing unit 15 may extract a luminance histogram as the amount of characteristics. In this case, the tracking processing unit 15 calculates the similarity by comparing a luminance histogram derived from the initial region and a luminance histogram derived from the selected region.

Furthermore, part or all of the elements included in the above image processing apparatus may be provided in one system LSI (large scale integration). The system LSI is a super multifunctional LSI manufactured by integrating plural components into one chip and is specifically a computer system which includes a microprocessor, a read only memory (ROM), a random access memory (RAM) and so on. For example, as shown in FIG. 1, the initial region obtainment unit 11, the transform parameter calculation unit 12, the first picture transform unit 13, the second picture transform unit 14, the tracking processing unit 15, and the output unit 16 may be provided by one system LSI 30.

Furthermore, the present invention may be implemented not only as the above image processing apparatus but also as a digital camera including characteristic components of the above image processing apparatus as shown in FIG. 2. Moreover, the present invention may be implemented as an image processing method including steps of operations of the characteristic components of the above image processing apparatus. Moreover, the present invention may be implemented as a program which causes a computer to execute the steps included in such an image processing method. Such a program may be distributed via a recording medium such as a CD-ROM or a transmission medium such as the Internet.

The digital camera or imaging apparatus according to an aspect of the present invention is useful for a digital video camera, a digital still camera, a security camera, a vehicle-mounted camera, a mobile phone with a camera function, or the like which specifies a region including an image of the target to be tracked and thereby tracks the image of the target.

REFERENCE SIGNS LIST

10 Image processing apparatus
11 Initial region obtainment unit
12 Transform parameter calculation unit
13 First picture transform unit
14 Second picture transform unit
15 Tracking processing unit
16 Output unit
17 Storage unit
30 System LSI
100 Digital camera
101 Imaging lens
102 Shutter
103 Imaging device
104 AD converter
105 Timing generation circuit
106 Image processing circuit
107 Memory control circuit
108 Image display memory
109 DA converter
110 Image display unit
111, 120 Memory
112 Resize circuit
113 System control circuit
114 Exposure control unit
115 Range control unit
116 Zoom control unit
117 Barrier control unit
118 Flash
119 Protector
121 Display unit 122 Nonvolatile memory
123 Mode dial switch
124 Shutter switch
125 Power control unit
126, 127, 131, 132 Connector
128 Power supply
129, 130 Interface
133 Recording medium
134 Optical finder
135 Communication unit
136 Antenna
137 Initial region obtainment circuit
138 Transform parameter calculation circuit
139 First picture transform circuit
140 Second picture transform circuit
141 Tracking processing circuit
142 Tracking result rendering circuit
143 Camera control circuit
400, 410, 420, 430 Original picture
401, 411, 421, 431 Target-quality picture
402, 403, 413, 433 Picture for output
403 Initial region
412, 422, 432 Picture for search
414 Target region
415 Region
416 Box
501 Initial region
502 Initial color histogram
511 Search region
512 Selected region
513 Selected color histogram
520 Overlapping part

The invention claimed is:

1. A digital camera which tracks images of a target on pictures successively captured, and executes, using a result of the tracking, at least one of an auto-focus process, an automatic exposure process, a framing process by camera control, and an automatic shooting process by camera control, the digital camera comprising:
a storage that stores a first transform parameter and information about an initial region, the initial region being a region on a first picture and including an image of the target, and the first transform parameter being a parameter that (i) corresponds to an image-capture environment in which the first picture is captured and (ii) transforms the first picture into a picture having a predetermined image quality;
a transform parameter calculator that calculates a second transform parameter according to an image-capture environment in which a second picture captured after the first picture is captured, the second transform parameter being a parameter for transforming the second picture into a picture having the predetermined image quality;
a first picture transformer that transforms the first picture into a picture for search having an image quality corresponding to an image quality of the second picture, using the first transform parameter stored in the storage and the second transform parameter calculated by the transform parameter calculator;
a tracking processor that tracks the images of the target by searching the second picture, for a target region having an amount of characteristics that is close to an amount of characteristics that quantitatively indicates characteristics of a region which is in the picture for search and corresponds to the initial region;
a second picture transformer that transforms the second picture into a picture for output, using a third transform parameter different from the second transform parameter; and
an output that outputs the picture and information indicating a position of the target region searched for by the tracking processor,
wherein a variation between a picture immediately previous to the second picture and the picture for output is less than a variation between the immediately previous picture and a picture obtained as a result of transforming the second picture using the second transform parameter, and wherein the transform parameter calculator:
calculates the second transform parameter as the third transform parameter when a difference value between the second transform parameter and an old third transform parameter is smaller than or equal to a predetermined threshold, the old third transform parameter being used to calculate an image for output which is immediately previous to the image for output in a sequence of successively captured pictures; and
calculates, as the third transform parameter, a value which makes the difference value between the second transform parameter and the old third transform parameter equal to the predetermined threshold when the difference value between the second transform parameter and the old third transform parameter is greater than the predetermined threshold.

2. The digital camera according to claim 1,
wherein the first parameter, the second parameter, and the third parameter are parameters for transforming pixel values of a plurality of pixels included in the captured picture, according to at least one of a color temperature, exposure, and a luminance value that are detected from the captured picture.

3. The digital camera according to claim 1,
wherein the first picture transformer is configured to transform one of the first picture and the second picture using a ratio between the first transform parameter and the second transform parameter.

4. The digital camera according to claim 1,
wherein, when transforming the first picture, the first picture transformer is configured to transform only an image included in the initial region on the first picture.

5. The digital camera according to claim 1, wherein the amount of characteristics is a color histogram indicating a frequency distribution of colors of pixels included in the picture, and
the tracking processor searches the second picture for a region having the color histogram that is highest in a proportion of an overlap with the color histogram of the initial region.

6. An image processing apparatus which tracks images of a target on pictures successively captured, the image processing apparatus comprising:
a storage that stores a first transform parameter and information about an initial region, the initial region being a region on a first picture and including an image of the target, and the first transform parameter being a parameter that (i) corresponds to an image-capture environment in which the first picture is captured and (ii) transforms the first picture into a picture having predetermined image quality;
a transform parameter calculator that calculates a second transform parameter according to an image-capture environment in which a second picture captured after the first picture is captured, the second transform parameter being a parameter for transforming the second picture into a picture having the predetermined image quality;
a first picture transformer that transforms the first picture into a picture for search having an image quality corresponding to an image quality of the second picture, using the first transform parameter stored in the storage and the second transform parameter calculated by the transform parameter calculator;
a tracking processor that tracks the images of the target by searching the second picture, for a target region having an amount of characteristics that is close to an amount of characteristics that quantitatively indicates characteristics of a region which is in the picture for search and corresponds to the initial region;
a second picture transformer that transforms the second picture into a picture for output using a third transform parameter different from the second transform parameter; and
an output that outputs the picture and information indicating a position of the target region searched for by the tracking processor,
wherein a variation between a picture immediately previous to the second picture and the picture for output is less than a variation between the immediately previous picture and a picture obtained as a result of transforming the second picture using the second transform parameter, and wherein the transform parameter calculator:
calculates the second transform parameter as the third transform parameter when a difference value between the second transform parameter and an old third transform parameter is smaller than or equal to a predetermined threshold, the old third transform parameter being used to calculate an image for output which is immediately previous to the image for output in a sequence of successively captured pictures; and
calculates, as the third transform parameter, a value which makes the difference value between the second transform parameter and the old third transform parameter equal to the predetermined threshold when the difference value between the second transform parameter and the old third transform parameter is greater than the predetermined threshold.

7. An image processing method performed by an image processing apparatus to track images of a target on pictures successively captured, the image processing apparatus including a storage storing a first transform parameter and information about an initial region, the initial region being a region on a first picture and including an image of the target, and the first transform parameter being a parameter that (i) corresponds to an image-capture environment in which the first picture is captured and (ii) transforms the first picture into a picture having predetermined image quality, the image processing method comprising:
calculating a second transform parameter according to an image-capture environment in which a second picture captured after the first picture is captured, the second transform parameter being a parameter for transforming a second picture into a picture having predetermined image quality;
transforming the first picture into a picture for search having image quality corresponding to image quality of the second picture, using the first transform parameter stored in the storage unit and the second transform parameter calculated in the calculating;
tracking the images of the target by searching the second picture for a target region having an amount of characteristics that is close to an amount of characteristics that quantitatively indicates characteristics of a region which is in the picture for search and corresponds to the initial region;
transforming the second picture into a picture for output using a third transform parameter different from the second transform parameter; and
outputting the picture and information indicating a position of the target region searched for in the tracking,
wherein a variation between a picture immediately previous to the second picture and the picture for output is less than a variation between the immediately previous picture and a picture obtained as a result of transforming the second picture using the second transform parameter, and wherein the calculation step:
calculates the second transform parameter as the third transform parameter when a difference value between the second transform parameter and an old third transform parameter is smaller than or equal to a predetermined threshold, the old third transform parameter being used to calculate an image for output which is immediately previous to the image for output in a sequence of successively captured pictures; and
calculates, as the third transform parameter, a value which makes the difference value between the second transform parameter and the old third transform parameter equal to the predetermined threshold when the difference value between the second transform parameter and the old third transform parameter is greater than the predetermined threshold.

8. An integrated circuit included in an image processing apparatus for tracking images of a target on pictures successively captured, the image processing apparatus including a storage storing a first transform parameter and information about an initial region, the initial region being a region on a first picture and including an image of the target, and the first transform parameter being a parameter that (i) corresponds to an image-capture environment in which the first picture is captured and (ii) transforms the first picture into a picture having predetermined image quality, the integrated circuit comprising:
a transform parameter calculator that calculates a second transform parameter according to an image-capture environment in which a second picture captured after the first picture is captured, the second transform parameter being a parameter for transforming the second picture into a picture having the predetermined image quality;
a first picture transformer that transforms the first picture into a picture for search having image quality corresponding to image quality of the second picture, using the first transform parameter stored in the storage and the second transform parameter calculated by the transform parameter calculator;
a tracking processor that tracks the images of the target by searching the second picture for a target region having an amount of characteristics that is close to an amount of characteristics that quantitatively indicates characteristics of a region which is in the picture for search and corresponds to the initial region;
a second picture transformer that transforms the second picture into a picture for output, using a third transform parameter different from the second transform parameter; and
an output that outputs the picture and information indicating a position of the target region searched for by the tracking processor,
wherein a variation between a picture immediately previous to the second picture and the picture for output is less than a variation between the immediately previous picture and a picture obtained as a result of transforming the second picture using the second transform parameter, and wherein the transform parameter calculator:

calculates the second transform parameter as the third transform parameter when a difference value between the second transform parameter and an old third transform parameter is smaller than or equal to a predetermined threshold, the old third transform parameter being used to calculate an image for output which is immediately previous to the image for output in a sequence of successively captured pictures; and calculates, as the third transform parameter, a value which makes the difference value between the second transform parameter and the old third transform parameter equal to the predetermined threshold when the difference value between the second transform parameter and the old third transform parameter is greater than the predetermined threshold.

9. The digital camera according to claim 1, wherein the first picture transformer transforms the first picture into the picture for search using a value obtained by dividing the first transform parameter by the second transform parameter.

10. The digital camera according to claim 1,
wherein the transform parameter calculator calculates the third transform parameter to generate a difference value between the third transform parameter and an old third transform parameter smaller than or equal to a difference value between the old third transform parameter and the second transform parameter, the old third transform parameter being used to calculate an image for output which is immediately previous to the image for output in a sequence of successively captured pictures.

11. A digital camera which tracks images of a target on pictures successively captured, and executes, using a result of the tracking, at least one of an auto-focus process, an automatic exposure process, a framing process by camera control, and an automatic shooting process by camera control, the digital camera comprising:

a storage that stores a first transform parameter and information about an initial region, the initial region being a region on a first picture and including an image of the target, and the first transform parameter being a parameter that (i) corresponds to an image-capture environment in which the first picture is captured and (ii) transforms the first picture into a picture having predetermined image quality;

a transform parameter calculator that calculates a second transform parameter according to an image-capture environment in which a second picture captured after the first picture is captured, the second transform parameter being a parameter for transforming the second picture into a picture having the predetermined image quality;

a first picture transformer that transforms the second picture into a picture for search having image quality corresponding to the image quality of the first picture, using the first transform parameter stored in the storage and the second transform parameter calculated by the transform parameter calculator;

a tracking processor that tracks the images of the target by searching the second picture for a target region having an amount of characteristics that is close to an amount of characteristics that quantitatively indicates characteristics of a region which is in the picture for search and corresponds to the initial region;

a second picture transformer that transforms the second picture into a picture for output, using a third transform parameter different from the second transform parameter; and an output that outputs the picture and information indicating a position of the target region searched for by the tracking processor, wherein a variation between a picture immediately previous to the second picture and the picture for output is less than a variation between the immediately previous picture and a picture obtained as a result of transforming the second picture using the second transform parameter, and wherein the transform parameter calculator:

calculates the second transform parameter as the third transform parameter when a difference value between the second transform parameter and an old third transform parameter is smaller than or equal to a predetermined threshold, the old third transform parameter being used to calculate an image for output which is immediately previous to the image for output in a sequence of successively captured pictures; and calculates, as the third transform parameter, a value which makes the difference value between the second transform parameter and the old third transform parameter equal to the predetermined threshold when the difference value between the second transform parameter and the old third transform parameter is greater than the predetermined threshold.

12. A digital camera which tracks images of a target on pictures successively captured, and executes, using a result of the tracking, at least one of an auto-focus process, an automatic exposure process, a framing process by camera control, and an automatic shooting process by camera control, the digital camera comprising:

a storage that stores a first transform parameter and information about an initial region, the initial region being a region on a first picture and including an image of the target, and the first transform parameter being a parameter that (i) corresponds to an image-capture environment in which the first picture is captured and (ii) transforms the first picture into a picture having predetermined image quality;

a transform parameter calculator that calculates a second transform parameter according to an image-capture environment in which a second picture captured after the first picture is captured, the second transform parameter being a parameter for transforming the second picture into a picture having the predetermined image quality;

a first picture transformer that transforms both the first picture and the second picture into target-quality pictures with substantially the same image quality, using the first transform parameter stored in the storage and the second transform parameter calculated by the transform parameter calculator;

a tracking processor that tracks the images of the target by searching the second picture for a target region having an amount of characteristics that is close to an amount of characteristics that quantitatively indicates characteristics of a region which is in the target-quality pictures and corresponds to the initial region;

a second picture transformer that transforms the second picture into a picture for output, using a third transform parameter different from the second transform parameter; and an output that outputs the picture for output and information indicating a position of the target region searched for by the tracking processor, wherein a variation between a picture immediately previous to the second picture and the picture for output is less than a variation between the immediately previous picture and a picture obtained as a result of transforming the second picture using the second transform parameter, and wherein the transform parameter calculator:

calculates the second transform parameter as the third transform parameter when a difference value between the second transform parameter and an old third transform parameter is smaller than or equal to a predetermined threshold, the old third transform parameter being used to calculate an image for output which is immediately previous to the image for output in a sequence of successively captured pictures; and calculates, as the third transform parameter, a value which makes the difference value between the second transform parameter and the old third transform parameter equal to the predetermined threshold when the difference value between the second transform parameter and the old third transform parameter is greater than the predetermined threshold.

* * * * *